United States Patent [19]

Light

[11] Patent Number: 4,717,482
[45] Date of Patent: * Jan. 5, 1988

[54] PRODUCTION OF LOW ALCOHOLIC CONTENT BEVERAGES

[75] Inventor: William G. Light, San Diego, Calif.

[73] Assignee: Allied Corporation, Morristown, N.J.

[*] Notice: The portion of the term of this patent subsequent to Oct. 14, 2003 has been disclaimed.

[21] Appl. No.: 916,767

[22] Filed: Oct. 8, 1986

Related U.S. Application Data

[63] Continuation-in-part of Ser. No. 736,047, May 20, 1985, Pat. No. 4,617,127.

[51] Int. Cl.$^4$ .............................................. B01D 13/00
[52] U.S. Cl. ..................................... 210/651; 210/654; 210/195.2
[58] Field of Search ............ 210/640, 651, 654, 195.2, 210/500.39, 500.37

[56] References Cited

U.S. PATENT DOCUMENTS 4,499,117  1/1985  Bonneau .............................. 426/592
4,617,127  10/1986  Light ............................ 210/195.2 X Primary Examiner—Frank Spear
Attorney, Agent, or Firm—Thomas K. McBride; John F. Spears, Jr.; Raymond H. Nelson

[57] ABSTRACT

Alcoholic beverages may be passed through a reverse osmosis system to form a permeate and a retentate. The permeate will comprise mainly alcohol and water and will be removed as will a minor portion of the retentate which is recovered as product. The major portion of the retentate is recycled back to the reverse osmosis system to admix with fresh beverage and added water. The product will comprise a beverage containing a lower alcoholic content than was possessed by the fresh beverage. The semipermeable membrane which is utilized in the reverse osmosis process will possess a chloride ion rejection rate greater than about 80% at 400 pounds per square inch net pressure.

13 Claims, 1 Drawing Figure

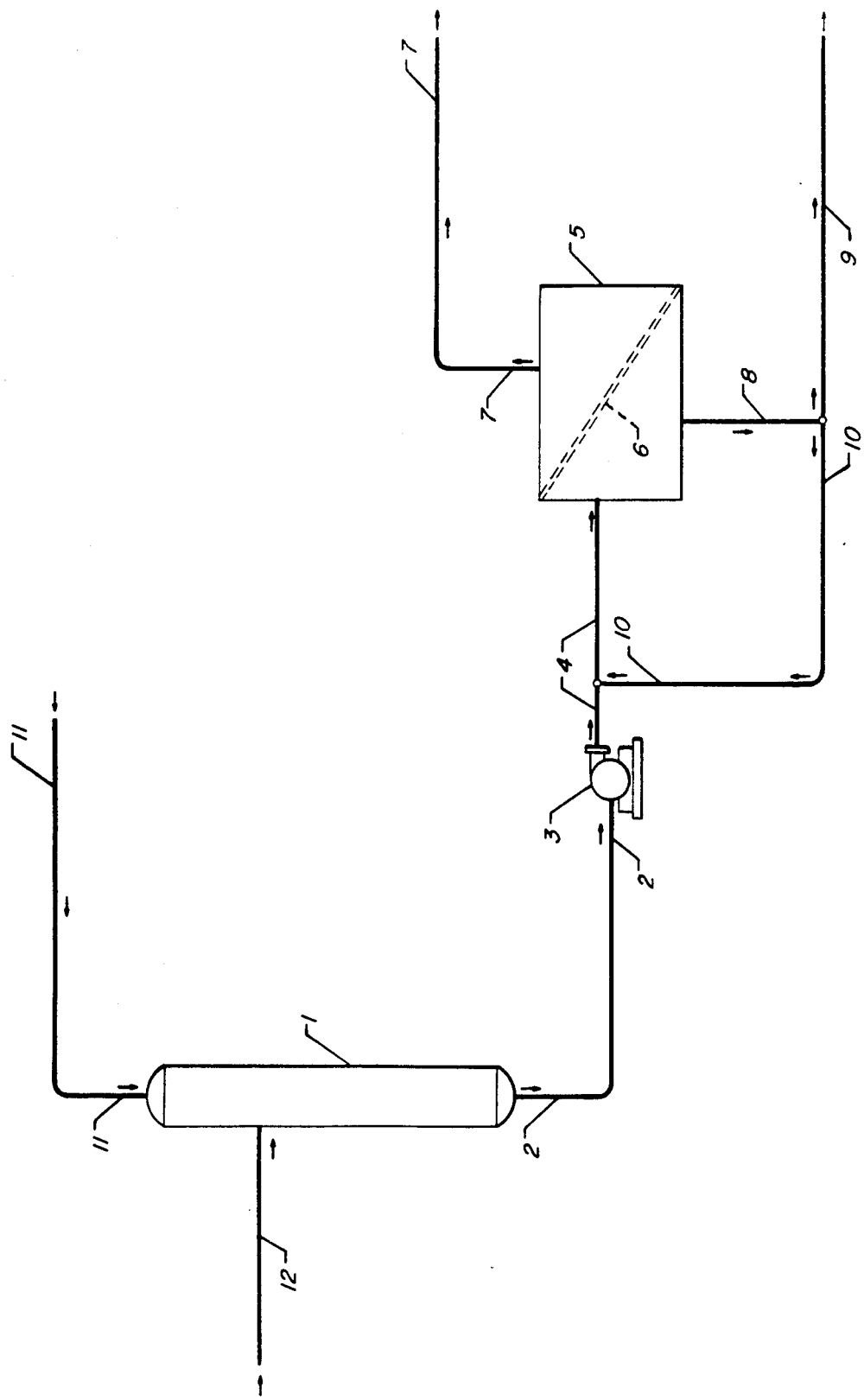

PRODUCTION OF LOW ALCOHOLIC CONTENT BEVERAGES

CROSS REFERENCE TO RELATED APPLICATION

This application is a continuation-in-part of my co-pending application Ser. No. 736,047 filed May 20, 1985, now U.S. Pat. No. 4,617,127, all teachings of which are incorporated herein by reference thereto.

BACKGROUND OF THE INVENTION

In accordance with the trend which is prevalent at the present time, many individuals are becoming increasingly aware of dietary restrictions. People are becoming concerned with their caloric intake and, in many instances, look favorably on foods which are low in calorie content. In addition to low calorie foods, people are also interested in beverages which fall within this category. This is readily apparent in the number of low calorie soft drinks which are presently on the market and which enjoy relatively large sales. Recently, within the past several years, alcoholic beverages which contain relatively few calories have become more popular. This trend toward beverages with low calorie content is exemplified by the switch of many beer drinkers to the so-called light beers. Inasmuch as a source of calories is found in the alcohol content of the beverage such as beer or wine, a necessity has arisen to produce a product which contains a relatively low alcohol content and yet retains flavor or taste which is acceptable in the public.

Many manufacturers of light beers have attempted to produce a beer which contains relatively few calories with a correspondingly low alcohol content and yet will retain the flavor or taste of a beer which will find favor with the general populace, said favorable taste characteristics including a sweet, malty taste which has a good clean end taste with no lingering or after-taste to spoil the experience. One method of accomplishing this purpose is to treat a beer with added water so that the alcohol content of the final product is within the desired limits. While the above discussion has been concentrated on beer as the alcoholic beverage, it is also contemplated that other beverages such as wine will also fall into this category and may be treated in a manner similar to that which is used in the treatment of beer.

However, by producing a product which contains a relatively low alcohol content, a problem has arisen in that the dilution with water of alcoholic beverages such as beer or wine has not won much favor due to problems in the taste of the alcoholic beverage, that being especially true in the beer industry. Likewise, the wine industry has a similar dilemma inasmuch as it is necessary to pick the grapes from which the wine is made at an earlier stage, thus obtaining grapes which contain less sugar content, and then having to interrupt the fermentation of the grapes to produce light wine. The industry has suffered by producing wines with great variations in taste. Another reason for producing alcoholic beverages with a low alcoholic content, but with palatable taste characteristics, is the accusation with which the industries have been faced concerning unnecessary intoxication of individuals with concurrent complications which arise therefrom such as traffic accidents.

Some prior U.S. patents have addressed the process for attaining alcohol-reduced beverages. For example, U.S. Pat. No. 3,291,613 discloses a process for manufacturing alcohol-reduced beverages in which an alcoholic beverage is heated under increased pressure following which the heated beverage is sprayed into a vacuum and collecting the droplets which result from said spraying to form a liquid. This liquid is then evaporated after being heated by utilizing the application of a vacuum. The steps of heating the liquid followed by vacuum-evaporating are repeated in a successive number in order to remove a portion of the alcoholic content of the beverage. Another U.S. Pat. No. 4,401,678 discloses a process for producing wine in which the grape juice which forms the wine for fermentation thereof is subjected to an ultrafiltration step which has the effect of removing alcohol as well as other components. However, the use of ultrafiltration is separate and distinct from the process of the present invention which utilizes a reverse osmosis system to obtain the desired result. For example, in ultrafiltration, the separation of components from each other is based on the size of the molecules of the components. The separation is effected by utilizing a porous membrane which possesses relatively large pores and thus is used to discriminate between the molecules of the various components based on the size of the molecules. In this respect, the membrane acts as a sieve, thus permitting molecules of relatively small size to pass through the membrane while rejecting the molecules which possess a larger size.

U.S. Pat. No. 3,552,574 discloses a reverse osmosis system which may be utilized to concentrate liquid foods by removing the water content and involves means in the unit for promoting turbulence whereby the surface of the membrane is scoured and thus prevents a concentration on the surface thereof.

U.S. Pat. No. 4,499,117 is directed to a method for the preparation of a low alcoholic content beverage by means of ultrafiltration. The patent utilizes a series of non-denaturing physical fractionation including ultrafiltration, reverse osmosis, and evaporating and distilling under vacuum, the ultimate product which is recovered being produced by the recovery and combination of the various retentates. However, the patent does not teach the net pressure range which is an integral part of the present invention nor does the patent speak to the fact that any portion of the retentate in the various steps should be recycled to the feed stream, but teaches in contrast to this, that the various fractions of the retentate step combined to form the final product.

In addition, British Patent Specification No. 1,447,505 relates to a process for the production of beer with a reduced, low or no alcohol content. This patent discloses a process for removing ethyl alcohol from beer using a membrane system which is operated in a batch-concentration type of system in which the beer which is being processed is either diluted with water prior to or subsequent to the process. However, this type of process possesses inherent disadvantages inasmuch as the concentrations of the other complex components which are present in the beer are altered, thereby leading to the probability that precipitates as well as other components which would foul the membrane can form. The precipitates and/or membrane foulants will therefore not only affect the taste of the beer, but will also reduce the productivity of the membrane system. In addition, the process which is described in this patent is operated at a relatively high pressure system, i.e., from 426 (3096 kPa) to 710 (5160 kPa) pounds per square inch (psi) while the inlet pressure is from about 28.4 (204.6 kPa) to 71 (511.5 kPa) psi. As will be shown in the following specification, it has now been discovered that the alcoholic content of a beverage may be reduced by utilizing a different reverse osmosis system in a continuous manner while employing a low net pressure of from about 50 (344.7 kPa) to about 250 (1723.7 kPa) psi and preferably at about 100 (689.5 kPa) psi. As another difference between this patent and the process of the present invention, the membrane which is utilized in the patent is permeable only to the alcohol and water constituents of the beer while in contrast, the membrane of the present invention is permeable to other constituents present in beer such as carbon dioxide, ethyl acetate, etc.

Other processes for obtaining a low alcohol content of beverages have involved a simultaneous dewatering and dealkylization of the beverages followed by reconstituting the beverage by the addition of water. However, this type of process is not acceptable in many instances. For example, in concentrating a beer to a level necessary to obtain a low alcohol product followed by the addition of water to reconstitute the beer, it has been found that when effecting the process at temperatures in the range of from about 2° C. to about 5° C., proteins which are present in the beer will precipitate out during the concentration. The addition of water will not resolubilize the proteins and thus permit the same to resume the former position in the beer. The loss of proteins by precipitation will, of course, constitute a disadvantage inasmuch as the precipitated proteins will be lost and thus lower the protein value of the beer. Furthermore, other disadvantages which may be present when utilizing such a process are that the taste of the low alcohol content beverage will not be the same as the taste present in the original beverage and thus, in many instances, constitute a detriment to the finished product.

As will hereinafter be shown in greater detail, a process has been developed in which low alcohol content beverages may be obtained utilizing a reverse osmosis process to reduce the alcohol content while permitting the desired alcohol content to be attained without any detrimental effects as to protein loss, change in taste, etc.

BRIEF SUMMARY OF THE INVENTION

This invention relates to a process for obtaining low alcohol content beverages. More specifically, the invention is concerned with a process for the removal of alcohol from alcoholic beverages such as beer and wine to produce a beverage having a lower alcohol content, the desired product, upon completion of the process, retaining its taste.

As was hereinbefore set forth, the desire for beverages such as beer and wine which possess a low alcohol content with a concurrent low calorie content is increasing. However, the product which contains this low alcohol and calorie content must retain the body and taste characteristics of the beverage from which it was obtained.

It is therefore an object of this invention to provide a process for producing low alcohol content beverages.

A further object of this invention is to provide a process for removing a portion of the alcoholic content of the beverage without a concurrent impairment of the taste or body characteristics.

In one aspect, an embodiment of this invention resides in a continuous feed and bleed process for the diminution of the alcoholic content of an alcoholic beverage which comprises passing a mixture of water and said beverage from a reservoir containing the same across a semipermeable membrane, said membrane possessing a chloride ion rejection rate greater than about 80% at 400 pounds per square inch net pressure and displaying a permeation rate for alcohol that is dependent on net pressure for low net pressure and that is essentially independent of net pressure for high net pressure, the separation conditions including a net pressure of from about 50 to about 250 pounds per square inch to form a permeate comprising alcohol and water, and a retentate comprising said beverage containing a reduced alcoholic content, removing said permeate, recycling a portion of said retentate to admix with added fresh alcohol beverage and water prior to contact with said semipermeable membrane to form a feed admixture, the portion of said retentate which is recycled comprising from about 80% to about 99% of said retentate, with the portion of the retentate which is not recycled being recovered as the product.

A specific embodiment of this invention is found in a process for the diminution of the alcoholic content of an alcoholic beverage which comprises passing a mixture of water and beer through a reverse osmosis system containing a semipermeable membrane comprising a thin film nonporous polymer consisting of a polyepichlorohydrin/ethylene diamine condensate cross-linked with toluene diisocyanate composited on polysulfone at a temperature in the range of from about 5° to about 20° C. and at a net pressure in the range of from about 50 (344.7 kPa) to about 250 psi (1723.7 kPa) to form a permeate comprising alcohol and water, recovering a portion of said retentate ranging from about 1% to about 20%, recycling the remaining portion of said retentate in said reverse osmosis system to admix with fresh beer and water prior to contact with said semipermeable membrane.

Other objects and embodiments will be found in the following detailed description of the invention.

DETAILED DESCRIPTION OF THE INVENTION

As hereinbefore set forth, the present invention is concerned with a process for producing low alcoholic content beverages, said process being effected by a removal of a predetermined amount of alcohol from the beverage. In the preferred embodiment of the invention the process is effected in a continuous type of operation which is distinct from the previously utilized modes of operation such as a batch or semibatch type operation.

The process of the present invention is effected in a continuous manner of operation which may also be described as a feed-and-bleed mode of operation. In this continuous type of operation, the alcoholic beverage and water are charged from a reservoir containing the same or through separate lines from separate sources to a reverse osmosis system in which the beverage is passed through a semipermeable membrane to produce a permeate and a retentate, the composition of these components being hereinafter described in greater detail. The reverse osmosis system or apparatus which is employed to effect the separation may comprise any of the various reverse osmosis apparati which are known in the art. The semipermeable membranes which are utilized in the reverse osmosis module will comprise a thin film nonporous polymeric barrier either utilized per se or composited on a polymeric support. These membranes are distinguished from ultrafiltration membranes which have been used in ultrafiltration separation processes. As was previously discussed, membranes which are used in ultrafiltration processes differ from those which are utilized in a reverse osmosis process. The ultrafiltration membranes are porous in nature and possess pores which may range in size from about 10 to about 500 Angstroms, the molecules of the various componets of the liquid which is to be separated being separated due to the difference in size of said molecules. In contradistinction to this, the membrane which is employed in a reverse osmosis system comprises a nonporous polymeric barrier, the separation of the components of a liquid system being effected by the relative difference in permeation rate for the various components of the mixture through the nonporous barrier. Component permeation rates are determined by the solubility of the components in the nonporous polymer and the diffusion coefficient for the component in the polymer.

It is contemplated within the scope of this invention that any known type of nonporous polymeric thin film membranes such as asymmetric membranes as exemplified by cellulose acetate membranes or noncellulosic membranes such as polyamides, polyimides, polyetherurea, polyetheramide may be employed. In addition to these polymers, it is also contemplated that membranes known as thin film composites may also be employed. These composites comprise an ultra-thin film having semipermeable properties, said film having been formed by contacting a solution of an amine-modified polyepihalohydrin such as polyepichlorohydrin or a polyethyleneimine with a solution of a polyfunctional agent capable of cross-linking the amine-modified polyepihalohydrin or polyethyleneimine such as mono-, di- or tribasic acid chlorides, an example of which being isophthaloyl chloride, aliphatic and aromatic diisocyanates such as toluene diisocyanate, thioisocyanate, etc. In one embodiment of the invention, the ultra-thin film is positioned on one side of a microporous polymeric support such as polysulfone which, if so desired, may be reinforced on the other surface thereof by the addition of a backing such as a fabric as exemplified by cotton, Dacron, etc. In the preferred embodiment of the invention, the membrane will possess a chloride ion rejection which is greater than about 80% when employing a net pressure differential of 400 psi (2757.9 kPa) in the process. In addition, another characteristic which is possessed by the membrane is that the membrane will display a permeation rate for alcohol which is dependent on net pressure for low net pressures and that is essentially independent of net pressures for high net pressures.

In the continuous mode of operation for producing a low alcoholic content beverage such as beer or wine, the process stream comprising the retentate which contains flavor components rejected by the membrane and possessing a reduced alcoholic content is divided into two portions. One minor portion of this retentate is bled from the system and collected as a product while the remaining major portion of the retentate is recycled to the reverse osmosis system and is admixed with fresh beverage and make-up water prior to passage through the semipermeable membrane of the type hereinbefore set forth in greater detail.

In order to operate the process in an efficient and economical manner, it has been discovered that certain variables be within a predetermined range while employing separation conditions which will include a temperature in the range of from about 5° to about 20° C., an applied pressure in the range of from about 200 (1378.9 kPa), to about 1000 psi (6894.8 kPa) and a low net pressure in the range of from about 50 (344.7 kPa) to about 250 psi (1723.7 kPa).

As hereinbefore set forth, the semipermeable membrane will possess an inherently high rejection rate for chloride ion, that is, greater than about 80% at a net pressure of 400 psi (2757.9 kPa). This high rejection is necessary in order to ensure that the flavor components which are present in the alcoholic beverage do not diffuse through the membrane into the permeate, but will remain in the retentate and thus will be present in the final product to ensure a constant flavor and taste for the beverage. This latter point is necessary in order that the alcoholic beverage containing a reduced alcoholic content retain its original flavor and taste, without which the attractiveness of the product will be greatly diminished.

There are various components comprising chemical compounds present in the alcoholic beverage which will contribute to the taste. It is therefore necessary that these components be retained in the retentate in order to ensure that the lower alcoholic content beverage will still retain the desired taste. As will hereinafter be shown in greater detail, three of the components of an alcoholic beverage such as beer which contribute to the taste are polar molecules and possess relatively lower molecular weights and might therefore be expected to possess a relatively low rejection rate and pass through the membrane as permeate as does ethanol. By utilizing a membrane which possesses a relatively high rejection rate for chloride ions, that is, about 80%, it has now been found that the taste components such as n-propanol, ethylacetate and isoamylalcohol possess a high rejection rate and remain in the retentate, thus contributing to the taste of the lower alcoholic content beverage. In addition, other components of the beverage which contribute to the taste and which possess a higher molecular weight and/or are less polar in nature will also remain in the retentate and thus retain the desired taste of the beverage. Thus, it was unexpected that reverse osmosis membranes which possess a chloride ion rejection rate of greater than about 80% will possess a sufficiently high rejection rate for flavor components which are present in the production of low alcoholic beverages such as beer or wine.

The permeate which diffuses through the membrane will comprise a mixture of alcohol, and specifically ethanol, and water along with other components of the beverage which are not required for the desired makeup of the product such as carbon dioxide, ethyl acetate and other constituents. The pressure which is employed in the process of this invention will effect the relative passage of the ethanol and water through the membrane and thus have some bearing on the relative amounts of alcohol and water which are removed from the beverage. This is due to the fact that it has been discovered that ethanol behaves both as a solvent and a solute. The passage of ethanol through the membrane increases with pressure, as is the case of a solvent such as water, at low pressure but is independent of pressure, as is the case of a solute such as sodium chloride, at high pressure. Inasmuch as the object of the invention is to maximize the passage of ethanol through the membrane relative to water, the preferred pressure which is employed is high enough to ensure that there is a substantial permeation rate for ethanol, but not so high that will permit a large volume of water to permeate through the membrane along with the ethanol. Therefore, the process is operated at a relatively low net pressure which is in the range hereinbefore set forth, that is, from about 50 (344.7 kPa) to about 250 psi (1723.7 kPa). By employing a net pressure within this range, it will ensure a rejection of alcohol by the membrane in a range of from about 40% to about 75%.

As was previously mentioned, the retentate is divided into two portions, one portion being collected as a product while the remaining portion is recycled to the reverse osmosis system. In the preferred embodiment of the invention the amount of retentate which is recycled back to the reverse osmosis system will range from about 80% to about 99% of the retentate, the remainder being that portion which is recovered as product. In addition, the permeate which is removed from the reverse osmosis system will comprise from about 1% to about 10% per pass of the total feed processed by the system. The removal and recovery of the permeate should be within this range inasmuch as the removal of a greater amount of permeate would serve to concentrate the retentate with the resulting precipitation of proteins and other constituents, thereby altering the flavor and taste characteristics of the beverage. If an amount less than about 1% were removed, the size of the reverse osmosis system would be too large to operate in an economically viable operation.

Another operating parameter which renders the process of the present invention attractive from an economical standpoint to operate is that the ratio of water flow rate to fresh beverage flow rate should not exceed about 8:1 volume/volume. If an amount of water would be added in a ratio greater than 8:1, the system would be utilized in a disadvantageous manner due to the cost thereof. Generally speaking, the amount of water which is added to the fresh feed to the reverse osmosis system will be dependent upon the desired alcoholic content of the finished product. By utilizing an amount of water which approaches the upper limit of the ratio which is about 8:1, it is possible to produce a beverage known in the trade as "no-alcohol" beverages, i.e., those beverages which possess an alcoholic content of less than 1%.

DESCRIPTION OF THE DRAWING

The present process will be further illustrated with reference to the accompanying drawing which illustrates a single flow diagram of the inventive feature of the process. Various mechanical devices such as condensers, gauges, valves, regulators, pumps, etc. have been eliminated as not being essential to the complete understanding of the process of this invention. The illustration of these, as well as other essential appurtenances, will become obvious as the drawing is described.

The FIGURE describes one embodiment of the process in which an alcoholic beverage such as beer or wine is contained in a reservoir or holding tank 1. The beverage is passed from reservoir 1 through line 2 to a pump 3 and from pump 3 through line 4 at a predetemined applied pressure to a reverse osmosis system 5 which contains a semipermeable nonporous polymeric barrier 6. In reverse osmosis system 5, which may be of any configuration known in the art, the beverage is contacted with reverse osmosis membrane 6 to form a permeate and a retentate. The permeate, in the desired amount per pass, comprising alcohol, water and, in some instances, other substituents such as carbon dioxide, ethyl acetate, is withdrawn from reverse osmosis system 5 through line 7. The retentate which contains substances or bodies which contribute to the taste, aroma as well as to the constituents of the beverage and which possess a lower alcoholic content than that of the fresh beverage shown by line 11 is withdrawn from reverse osmosis system 5 through line 8. A lesser portion of the retentate is bled from the system through line 9 and recovered while a greater portion of the retentate in an amount ranging from about 80% to about 99% of that withdrawn from reverse osmosis system 5 is recycled through line 10 in the system and admixed with fresh feed from reservoir 1. Additional fresh beverage and water are charged to reservoir 1 through lines 11 and 12, respectively, the addition of the water and the fresh beverage being in a volume ratio within the range hereinbefore set forth.

It is to be understood that the FIGURE represents only one embodiment of the invention and that the present invention is not limited to this illustration. For example, variations of the flow scheme may be employed such as omitting the reservoir or holding tank and admixing the beverage feed and water in a single line which is then passed through pump 3, or in the alternative through separate lines through pump 3. Although a single stage reverse osmosis system is illustrated, it is also contemplated that multiple stages may also be employed in the event that various alcohol contents of the final product are desired.

The following examples are given to illustrate the process of the present invention. However, it is understood that these examples are given merely for purposes of illustration, and that the present invention is not necessarily limited thereto.

EXAMPLE I

Beer which contained an ethanol content of 4% was charged to a reverse osmosis system which included a module containing a thin film membrane comprising an amine-modified polyepichlorohydrin cross-linked with toluene diisocyanate composited on a porous polysulfone backed with a fabric. In addition, the system was also provided with a heat exchanger, pumps and pressure control valves.

The system was flushed with beer for a period of about ten minutes following which the beer was continuously passed through the system at an applied pressure of about 350 psi (2413.2 kPa) while maintaining the temperature in a range of from 9° to 11° C. The net pressure at which the beer contacted the membrane was about 100 psi. After passage of the beer through the reverse osmosis system at a rate of about 7 gallons per minute (gpm) with a permeate flow rate (0.2 gpm) giving 3% recovery per pass it was found that there had been a reduction of the ethanol content of the beer of 50%, the recovered retentate containing about 2% alcohol.

The treatment of the beer was maintained for a period of about 2.5 hours while adding fresh beer and water at a ratio of about 2 volumes of water per volume of beer. The recovery of the desired retentate product was effected while recycling about 98% of the retentate (6.7 gpm) to the system and recovering about 2% of the retentate (0.1 gpm).

EXAMPLE II

The above experiment was repeated by passing beer through a reverse osmosis system at various net pressures and determining the flux values of water and ethanol. The results of these series of tests are set forth in the Table below:

TABLE 1

| Net Pressure psi (kPa) | Flux Values (gallons per square foot of membrane area per day) | |
|---|---|---|
| | Ethanol | Water |
| 0 | 0.000 | 0.00 |
| 20 (137.9) | 0.0150 | 0.45 |
| 40 (275.8) | 0.0275 | 0.90 |
| 60 (413.7) | 0.0425 | 1.35 |
| 80 (551.6) | 0.0525 | 1.80 |
| 100 (689.5) | 0.0620 | 2.25 |
| 120 (827.4) | 0.0675 | 2.70 |
| 140 (965.3) | 0.0720 | 3.15 |
| 160 (1103.2) | 0.0750 | 3.60 |
| 180 (1241.1) | 0.0775 | 4.05 |
| 200 (1378.9) | 0.0790 | 4.50 |
| 220 (1516.8) | 0.0815 | 4.95 |
| 240 (1654.7) | 0.0820 | 5.40 |
| 260 (1792.6) | 0.0825 | 5.85 |
| 280 (1930.5) | 0.0825 | 6.30 |
| 300 (2068.4) | 0.0825 | 6.75 |
| 320 (2206.3) | 0.0825 | 7.20 |

It is noted from the above Table that the preferred operating range for the net pressure ranges from 50 to about 250 psi.

These data show that water behaves like a conventional solvent, with flux being linearly dependent on the net pressure differential across the membrane. In contrast, flux for conventional solutes such as sodium chloride is independent of net pressure differential and is determined by the transmembrane solute concentration gradient. In reference to the conventional definitions, data in Table 1 indicate that the reverse osmosis membrane treats ethanol as both a solvent (at low net pressure) and a solute (at high net pressure).

For removing ethanol from beverages, it is important to exploit the increase in ethanol flux with increasing net pressure for low net pressure, employing a net pressure of greater than about 50 psi (344.7 kPa) to give a substantial ethanol flux and an acceptable system size. As there is no benefit to employing a net pressure greater than 250 psi (1723.7 kPa) since ethanol flux is essentially independent of net pressure beyond this value and there is the detriment of expending increasing quantities of valuable water, the preferred operating net pressure for a system is in the range from about 50 (344.7 kPa) to about 250 psi (1723.7 kPa). The optimum net pressure within this range is selected on considering costs for energy, equipment, reverse osmosis devices, and water for a particular application.

EXAMPLE III

The reduction of alcohol content in beer as set forth in Example I above could be repeated utilizing operating conditions similar in nature to those hereinbefore described. However, in this example two process stages in place of one would be used to reduce the ethanol content of the beer from 4% in the feed stock to 1% in the retentate. The ratio of water volume to beer volume which would be added to the system is 4:1 in place of 2:1.

EXAMPLE IV

In this example, 8 samples of a nonporous cellulosic blend membrane were subjected to treatment with a feedstock of water containing 2 g/L of sodium chloride. The feed was charged across the surface of these membranes which had a surface area of 3 square inches, at a net pressure of 400 pounds per square inch with a temperature of 25° C. for a period of 1.5 hours. The results of the 8 samples are set forth in the table below:

TABLE 2

| CELL # ID | FLUX | |
|---|---|---|
| | GFD | REJECTION % |
| 1 | 61.3 | 78.2 |
| 2 | 61.3 | 76.9 |
| 3 | 60.1 | 76.4 |
| 4 | 63.9 | 75.6 |
| 5 | 58.7 | 78.2 |
| 6 | 62.4 | 76.7 |
| 7 | 61.3 | 76.7 |
| 8 | 61.7 | 77.2 |
| Average | 61.3 | 77.0 |

It should be noted from the above table that the chloride ion rejection rate of the membranes ranged from about 75% to about 78%.

EXAMPLE V

To illustrate the ability of the above membranes to separate ethanol from an alcoholic beverage while retaining the desired components which contribute to the taste of the beverage, four tests were run utilizing samples of the membrane described in Example IV above. Beer was charged to a reverse osmosis system containing the cellulosic blend membrane in a manner similar to that set forth in Example I above. The reaction conditions included a temperature of 14° C. and a feed pressure which ranged from 300 pounds per square inch to 470 pounds per square inch. The passage of the beer through the reverse osmosis system was effected at a rate of about 1 gallon per minute with a permeate flow rate of about 10 milliliters per minute for a period of about 1 hour. The results of these tests using four separate membranes are set forth in the table below:

TABLE 3

| Membrane Sample | Feed Pressure (psi) | Net Pressure Estimate (psi) | Membrane Rejection (%) | | | |
|---|---|---|---|---|---|---|
| | | | Ethanol | n-propanol | Ethyl Acetate | i-amyl Alcohol |
| A | 330 | 200 | 10.5 | — | 73.8 | 50.9 |
| B | 330 | 200 | 14.7 | 43.7 | 69.0 | 46.3 |
| C | 470 | 300 | 15.9 | 51.5 | 73.5 | 55.9 |
| D | 470 | 300 | 13.0 | 49.1 | 66.7 | 51.6 |
| Average | | | 13.5 | 48.1 | 70.8 | 51.2 |

It is noted from the above table that the percentage rejection of ethanol averaged only 13.5% while the rejection of the small polar organic material comprising n-propanol, ethylacetate and isoamylalcohol was relatively great, that is, averaging over 50%. This is an indication that substantially more than 50% of all of the taste contributing components will remain in the retentate and thus the alcoholic beverage which contains a lower alcoholic content will retain the desired taste of the beverage.

I claim:

1. A continuous feed and bleed process for the diminution of the alcoholic content of an alcoholic beverage which comprises passing a mixture of water and said beverage from a reservoir containing the same across a semipermeable membrane, said membrane possessing a chloride ion rejection greater than about 80% at 400 pounds per square inch net pressure and displaying a permeation rate for alcohol that is dependent on net pressure for low net pressure and that is essentially independent of net pressure for high net pressure, the separation conditions including a net pressure of from about 50 to about 250 pounds per square inch to form a permeate comprising alcohol and water, and a retentate comprising said beverage containing a reduced alcoholic content, removing said permeate, recycling a portion of said retentate to admix with added fresh alcoholic beverage and water prior to contact with said semipermeable membrane to form a feed admixture, the portion of said retentate which is recycled comprising from about 80% to about 99% of said retentate, with the portion of the retentate which is not recycled being recovered as the product.

2. The process as set forth in claim 1 in which the semipermeable membrane rejection of said alcohol at said net pressure is in a range of from about 40% to about 75%.

3. The process as set forth in claim 1 in which said separation conditions include a temperature in the range of from about 5° to about 20° C. and an applied pressure in the range of from about 200 to about 1,000 pounds per square inch.

4. The process as set forth in claim 1 further characterized in that said process is effected so that the percentage of the system feed that is recovered as permeate is in a range of from about 1% to about 10% per pass through said system.

5. The process as set forth in claim 1 further characterized in that the ratio of water flow rate to fresh alcoholic beverage flow rate is less than about 8:1 volume/volume.

6. The process as set forth in claim 1 further characterized in that said semipermeable membrane comprises a thin film nonporous polymeric barrier.

7. The process as set forth in claim 6 further characterized in that said thin film nonporous polymeric barrier is composited on a polymeric support.

8. The process as set forth in claim 6 further characterized in that said thin film nonporous polymeric barrier comprises an amine-modified polyepihalohydrin cross-linked with toluene diisocyanate.

9. The process as set forth in claim 6 further characterized in that said thin film nonporous polymeric barrier comprises an amine-modified polyepihalohydrin cross-linked with isophthaloyl chloride.

10. The process as set forth in claim 6 further characterized in that said thin film nonporous polymeric barrier comprises polyethyleneimine cross-linked with isophthaloyl chloride.

11. The process as set forth in claim 7 in which said polymeric support comprises polysulfone.

12. The process as set forth in claim 1 in which said alcoholic beverage is beer.

13. The process as set forth in claim 1 in which said alcoholic beverage is wine.

* * * * *